(12) United States Patent
Liu et al.

(10) Patent No.: US 9,129,151 B2
(45) Date of Patent: **\*Sep. 8, 2015**

(54) METHOD AND APPARATUS FOR AUTOMATED ANALYSIS AND IDENTIFICATION OF A PERSON IN IMAGE AND VIDEO CONTENT

(71) Applicant: AT&T Intellectual Property I, L.P., Atlanta, GA (US)

(72) Inventors: Zhu Liu, Marlboro, NJ (US); Andrea Basso, Turin (IT); Lee Begeja, Gillette, NJ (US); David C. Gibbon, Lincroft, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,050

(22) Filed: Jun. 18, 2014

(65) Prior Publication Data

US 2014/0301609 A1 Oct. 9, 2014

Related U.S. Application Data

(63) Continuation of application No. 13/207,974, filed on Aug. 11, 2011, now Pat. No. 8,792,684.

(51) Int. Cl.
 *G06K 9/00* (2006.01)
 *G06K 9/68* (2006.01)
 *G06F 17/30* (2006.01)
(52) U.S. Cl.
 CPC ...... *G06K 9/00288* (2013.01); *G06F 17/30247* (2013.01); *G06K 9/00677* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 5,410,609 A | 4/1995 | Kado et al. | |
| 6,690,883 B2 | 2/2004 | Pelletier | |
| 7,519,200 B2 | 4/2009 | Gokturk et al. | |
| 7,602,947 B1 | 10/2009 | Lemelson et al. | |
| 7,730,036 B2 | 6/2010 | Blose et al. | |
| 7,809,192 B2 | 10/2010 | Gokturk et al. | |
| 8,027,541 B2 | 9/2011 | Hua et al. | |
| 8,140,570 B2 | 3/2012 | Ingrassia et al. | |
| 8,260,008 B2 * | 9/2012 | Hanna et al. | 382/115 |
| 2005/0117783 A1 | 6/2005 | Sung et al. | |
| 2005/0276452 A1 | 12/2005 | Boland | |
| 2006/0044398 A1 | 3/2006 | Foong et al. | |
| 2006/0104504 A1 | 5/2006 | Sung | |
| 2007/0098303 A1 | 5/2007 | Gallagher et al. | |
| 2008/0304808 A1 | 12/2008 | Newell et al. | |
| 2009/0282336 A1 | 11/2009 | Lindley et al. | |
| 2011/0211736 A1 | 9/2011 | Krupka et al. | |
| 2011/0228984 A1 | 9/2011 | Papke et al. | |

\* cited by examiner

*Primary Examiner* — Daniel Mariam
(74) *Attorney, Agent, or Firm* — Chiesa Shahinian & Giatomasi PC

(57) ABSTRACT

A method, apparatus, and computer readable medium for identifying a person in an image includes an image analyzer. The image analyzer determines the content of an image such as a person, location, and object shown in the image. A person in the image may be identified based on the content and event data stored in a database. Event data includes information concerning events and related people, locations, and objects determined from other images and information. Identification metadata is generated and linked to each analyzed image and comprises information determined during image analysis. Tags for images are generated based on identification metadata. The event database can be queried to identify particular people, locations, objects, and events depending on a user's request.

20 Claims, 5 Drawing Sheets

FIG. 4

| EVENT ID 410 | DATE 412 | TIME 414 | EVENT TITLE 416 | LOCATION 418 | PEOPLE PRESENT 420 | OBJECTS PRESENT 422 | LANDMARKS 424 | ENVIRONMENTAL CONDITIONS 426 |
|---|---|---|---|---|---|---|---|---|
| 1 | 10/31/2010 | 1:00 PM | HALLOWEEN | BOB SMITH'S HOUSE | BOB SMITH; JON JONES; WILLIAM POST; ELLEN JONES; MARK JOHNSON | PUMPKIN; SKELETON; | NONE | INDOORS |
| 2 | 12/25/2010 | 8:00 AM | CHRISTMAS | PARIS, FRANCE | MANON ST. PIERRE; JEAN LUC VANHASS | TABLE; CHAIR; VASE; ROSE | EIFFEL TOWER | OVERCAST |
| 3 | 5/6/2010 | 2:30 PM | BOB SMITH'S BIRTHDAY | 87 43 31 W, 42 2 26 N | MARY SMITH; TOM LUCAS; JENNIFER KIEL | CAKE; CANDLES; CUBICLES | NONE | INDOORS |
| 4 | 3/5/2009 | 7:00 PM | 3/5/2009 7:00 PM | SKOKIE, IL | ANDREA DELMON; LEWIS HENRY; AGATHA WINDSOME | NONE | NONE | INDOORS |
| ... | ... | ... | ... | ... | ... | ... | ... | ... |
| ... | ... | ... | ... | ... | ... | ... | ... | ... |

FIG. 5

| | PERSON ID 510 | NAME 512 | DATE 514 | TIME 516 | PANTS 518 | SHIRT 520 | SHOES 522 | HAT 524 | EYEWEAR 526 | HAIR COLOR 528 | HAIR LENGTH 530 |
|---|---|---|---|---|---|---|---|---|---|---|---|
| 500 | 1 | BOB SMITH | 10/31/2010 | 1:00 PM | BLUE JEANS | WHITE COLLARED | WHITE SNEAKERS | BASEBALL CAP | NONE | BROWN | SHORT |
| 502 | 2 | JON JONES | 6/8/2010 | 3:47 PM | BROWN SLACKS | LIGHT BLUE DRESS SHIRT | BLACK LEATHER SHOES | NONE | GLASSES | BLACK | CREW CUT |
| 504 | 3 | WILLIAM POST | 3/26/2010 | 9:38 AM | BLACK SLACKS | WHITE DRESS SHIRT | BLACK LEATHER SHOES | FEDORA | SUNGLASSES | UNKNOWN | UNKNOWN |
| | ... | ... | ... | ... | ... | ... | ... | ... | ... | ... | ... |
| | ... | ... | ... | ... | ... | ... | ... | ... | ... | ... | ... |

20

METHOD AND APPARATUS FOR AUTOMATED ANALYSIS AND IDENTIFICATION OF A PERSON IN IMAGE AND VIDEO CONTENT

This application is a continuation of U.S. patent application Ser. No. 13/207,974 filed Aug. 11, 2011 the disclosure of which is herein incorporated by reference in its entirety.

FIELD OF THE DISCLOSURE

The present disclosure relates generally to visual identification, and more particularly to identifying a person in an image or video.

BACKGROUND

Image acquisition devices such as video and still picture cameras allow users to record images of various events. After images have been captured, the images are often loaded onto a local or remote storage device, such as a hard drive, for later retrieval. Since storage devices can contain a large number of images, the identification and categorization of images is a problem. Further, since a large number of images are stored, specific images of people, places, or objects are hard to locate.

Facial recognition can be used to detect people in images. However, facial recognition can fail to correctly identify people and also may not be able to detect a person when the person's appearance changes.

SUMMARY

In one embodiment, a method for image analysis comprises determining the content of the image and identifying the person in the image based on the content and event data. Identification metadata is generated after the person in the image is identified. The identification of the person in the image may additionally be based on existing metadata associated with the image. Determining content in the image may include determining a location depicted in an image and a preliminary identification of a person in the image. In one embodiment, a notification is transmitted to a person identified in the image. Identification metadata associated with the image may be linked to the image. In another embodiment, a tag for an image is generated based on metadata associated with the image.

These and other advantages of the general inventive concept will be apparent to those of ordinary skill in the art by reference to the following detailed description and the accompanying drawings.

BRIEF DESCRIPTION OF THE DRAWINGS

FIG. 4 depicts the organization of an event table stored in an event database according to one embodiment;
FIG. 5 depicts the organization of a person table stored in the event database according to one embodiment.

DETAILED DESCRIPTION

Described in an embodiment of the disclosed technology is a method and apparatus for identifying a person in an image. Images are analyzed by an image analyzer to determine content of an image. The content of an image can include a person, a location, an object, an environmental condition, etc. For example, an image may show a man (person) at the Grand Canyon (location) holding an umbrella (object) on a rainy day (environmental condition) as determined by facial, object, and environmental condition recognition. In this example, the content of the image consists of a person, the Grand Canyon, an umbrella, and rain. Facial recognition can be used to make a preliminary identification of person in the image. The content of the image is then used in conjunction with event data stored in a database to identify the person in the image (or confirm the preliminary identification of the person in the image determined using facial recognition). If the person in the image is preliminarily identified as Bob Jones using facial recognition, this preliminary identification can be confirmed using determined content in conjunction with event data stored in an event database. The event database contains a number of tables comprised of records of events, people, objects, etc. For example, event records can indicate the date and time of an event, people who attended the event, the location of the event, and objects at the event. Person records can contain information concerning where a person was at various dates and times, what the person was wearing at those dates and times, as well as visual characteristics of the person at those dates and times. The information in the event data can be entered by a user or determined using images retrieved from various sources and analyzed.

The preliminary identification of Bob Jones in the image can be confirmed by determining if Bob Jones was at the Grand Canyon at a date and time associated with the image (e.g., from metadata associated with the image) using information contained in the event database. If information in the event database indicates that Bob Jones was at the Grand Canyon at the date and time associated with image, then the preliminary identification of Bob Jones can be confirmed. Identification metadata indicating that Bob Jones is shown in the image is then generated and linked with the analyzed image.

Figure 1:
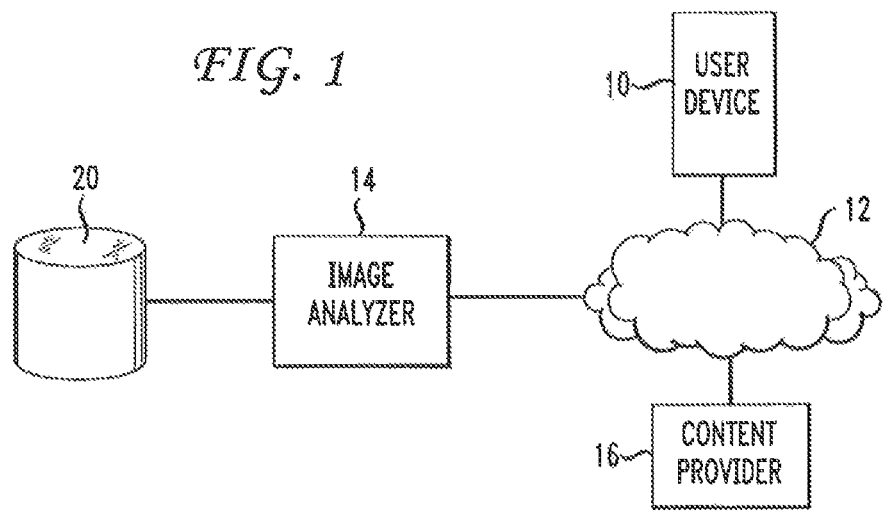
FIG. 1 shows a system for identifying a person in an image.

FIG. 1 shows a schematic of a system in which one embodiment of a method for identifying people in images and video may be implemented. User device 10 is an electronic device such as a personal computer, digital camera, personal digital assistant, smart phone, or cell phone. User device 10 is in communication with image analyzer 14 via network 12 which can be any type of wired or wireless network. Network 12 can vary in size from a local area network to a wide area network. Network 12, in one embodiment, is the Internet. User device 10 may alternatively be connected directly to image analyzer 14. As shown in FIG. 1, image analyzer 14 is also in communication with content provider 16 via network 12. Although only one content provider is shown, image analyzer 14 can connect to multiple providers via network 12. Content provider 16 may be one of various providers such as businesses or individuals providing information to others via network 12. Although not shown in FIG. 1, image analyzer 14 can be connected via network 12 to additional sources of information including both public sources such as businesses and private sources such as individuals. Image analyzer is in communication with database 20 which stores images and associated data such as metadata and audio related to an image.

Image analyzer 14 analyzes images to identify people shown in these images. Image analyzer 14 uses event data stored in event database 20 in conjunction with content identified in a particular image to identify people shown in the particular image. Images for analysis may be received or retrieved from user device 10, network 12, or content provider 16. For example, a user may transmit an image for analysis from user device 10 via network 12 to image analyzer 14. Images may also be retrieved from user device 10, network 12, and content provider 16 via a request from image analyzer 14. In one embodiment, image analyzer 14 crawls network 12 searching for images for analysis. It should be noted that an image may be one of a sequence of images in a video. Thus, video can be analyzed as described herein similar to images but on a frame by frame or scene by scene basis.

Figure 2:
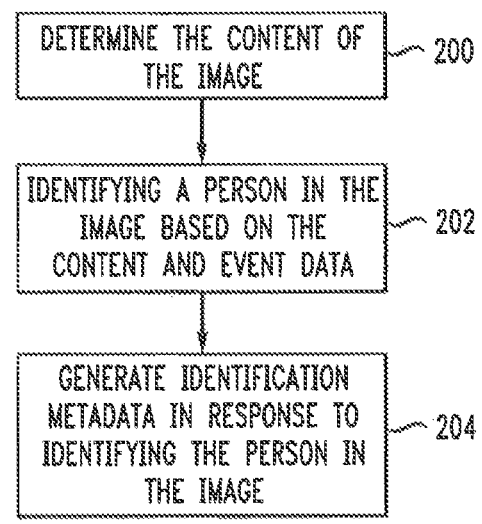
FIG. 2 is a flowchart showing a method for use with the system of FIG. 1.

FIG. 2 depicts a flowchart of a method for identifying a person in an image, according to one embodiment, for use with the system of FIG. 1. A particular image to be analyzed can be acquired in various ways such as transmitted to image analyzer 14 by a user via user device 10 or retrieved from network 12 or content provider 16 by image analyzer 14. At step 200 image analyzer 14 determines the content of the image. The content of an image is what the image depicts. For example, the content of an image is the people, place, objects, environmental conditions, etc. shown in the image. At step 202, image analyzer 14 identifies a person in the image based on the content determined in step 200 and event data, as described in further detail below. At step 204 image analyzer 14 generates identification metadata in response to determining the person in the image.

In one embodiment, the identification metadata associated with an image can be used to generate one or more tags for the image. Tagging is metadata associated with an image and may be generated by a user. Tags can also be generated by a computer by analyzing the images and associated data. Tagging can be automated using the identification metadata generated using the method depicted in FIG. 2. Automated tagging of images can be based on generated identification metadata alone or in conjunction with tags currently associated with an image.

Figure 3:
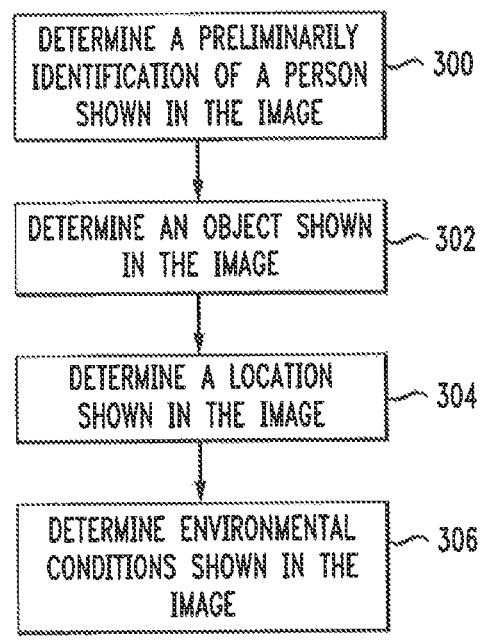
FIG. 3 is a flowchart showing details of step 200 in FIG. 2.

FIG. 3 depicts a flowchart of steps performed when determining the content of an image in step 200 of FIG. 2. At step 300, image analyzer 14 makes a preliminary identification of a person shown in the image using, in one embodiment, facial recognition. In addition, various expressions a person makes can be used to assist in identification (e.g. emotion detection). Other types of identification may be used such as body recognition, activity or gait recognition, lip-based activity recognition, iris recognition, fingerprint recognition, etc. depending on what features of a person the image contains. Another type of identification can be based on the clothes a person wears frequently.

At step 302, image analyzer 304 determines an object shown in the image. An object is a thing or physical body. Object recognition is used in one embodiment to identify objects depicted in an image. For example, vehicles, furniture, household items, and other objects may be identified in an image using object recognition. Objects that are rare or unique may be additionally classified as landmarks (e.g. the Eiffel Tower or Cinderella's Castle).

At step 304, image analyzer 14 determines a location shown in the image. A location is a place shown in an image and, in many images, the place the image was captured. Environmental features (e.g., scenery) and objects determined to be shown in an image may be used to determine the location shown in an image. For example, scenery such as grassy rolling hills, sand dunes, jungle, city, or other scenery may provide clues as to the location shown in an image. Objects and landmarks determined to be shown in an image may also be used to determine the location shown in the image. Although well known landmarks such as the Eiffel Tower, Mount Rushmore, or the Statue of Liberty may enable image analyzer 14 to determine a location with a relatively high level of confidence, other less famous "landmarks" can be used to determine a location as well. For example, a person's house may be distinctive enough to determine a location shown in an image with a certain level of confidence. One or more environmental features and objects may be identified and used in the determination of a location shown in an image.

At step 306, image analyzer determines environmental conditions shown in the image. Environmental conditions include weather and evidence of recent weather (e.g., snow). For example, the weather shown in an image such as rain, sleet, or snow, may be identified. In addition, other environmental conditions, such as the position of the sun or stars shown in an image, may be identified in addition to weather conditions.

Additional steps for determining other types of content in an image not shown in FIG. 3 may be used as well. For example, text contained in an image may be recognized and interpreted using text recognition. The clothing a person is wearing, the person's hair color and length, and other potential identifying characteristics and features may be determined as well. Other potential identifying characteristics and features include emotion detection, the origin of the video or photo (i.e., who took it and where), email addresses of whoever sent it (or to whomever it was sent), the age of the image (when it was taken), the ages of the people in the image, and audio information in the video that contains the image.

It should be noted that the determinations in the steps of FIG. 3, as well as determinations of other types of content shown in an image, may not result in accurate identifications. To account for this potential inaccuracy, a level of confidence concerning the accuracy of a determination can be generated and associated with each determination. For example, a confidence level of 1 to 100 can be associated with a determination. If a determination is made in which multiple points of data correspond, then a high confidence level such as 90 may be associated with the determination. If a determination is made in which only a few points of data correspond, then a low confidence level such as 10 may be associated with the determination. The determination and their associated levels of confidence can be used to aid in identifying the person in the image and the content of the image as described further below.

Existing metadata is often associated with an image captured using a camera or other device. Existing metadata can indicate the date the image was captured, the time of capture, and in some cases, additional information such as the camera make and model, and camera setting used for the photo. In some cases, existing metadata may also include geographic information indicating the location of the camera when the image was captured. Existing metadata may be associated with an image using a standard such as Exchangeable Image File Format (EXIF) or other standard. Existing metadata can be used to assist in determining the content of an image.

Content of the image determined in step 200 of FIG. 2 and described in steps 300-306 of FIG. 3 is then used in conjunction with event data to identify the person in the image at step 202 of FIG. 2.

Event data consists of information concerning a particular event, people, objects, locations, environmental conditions, etc. Event data is generated by analyzing images received from users and retrieved from various sources such as network 12 and content provider 16. Event data may also be generated by a user entering data. Event data is stored in event database 20, in one embodiment, as a collection of tables which can be accessed by image analyzer 14. A particular event can be considered a specific time or a range of times in which something occurred. For example, an event may have occurred on Jan. 1, 2010 at 1:01 am or other date and time. Particular events may have a specific duration such as a few seconds (e.g., sports play), a few minutes (e.g., a child's recital), or hours (e.g., a wedding).

FIG. 4 depicts an example of how event data corresponding to particular events may be stored as an event table in database 20 according to one embodiment. Each event record 400, 402, 404, 406, etc. has a unique identification number 410. Each event record 400-406 has multiple fields associated with it, for example, date 412, time 414, event title 416, location 418, people present 420, objects present 422, landmarks 424, environmental conditions 426, etc. Additional fields may be added to further define events (such as a time zone). As described above, data in the event table of FIG. 4 may be generated by a user entering data or from images acquired and analyzed by image analyzer 14.

Event database 20 also stores tables concerning specific people, objects, locations, and environmental conditions. FIG. 5 depicts an example of a person table in which data concerning people may be stored. Each person record 500, 502, 504, etc. has a unique person ID 510. Each person record 500-504 has multiple fields associated with it, for example, name 512, date 514, time 516, pants 518, shirt 520, shoes 522, hat 524, eyewear 526, hair color 528, and hair length 530. Additional fields may be added to further define a specific person at a specific date and time (such as a time zone). Similar to the event table of FIG. 4, the data in the person table of FIG. 5 may be generated by a user entering data or from images acquired and analyzed by image analyzer 14.

Event data can be generated based on images previously acquired from various sources. For example, event data can be generated by analysis of various images obtained from content provider 16. An individual's collection of photos located on user device 10 may be used to generate event data. Additional information can be obtained from other sources such as contact lists, email addresses, calendars, notes, public event announcements, social networking linkages between friends and family, personal call history, frequent co-location of one or more people as determined by location information form global positioning services (GPSs), etc.

Returning to FIG. 2, at step 202, the content determined in the image and the event data are used to identify a person in an image in a variety of ways.

A preliminary identification of a person based on image content using facial recognition can be confirmed using event data. For example, if a person in an image is preliminarily identified as Bob Jones, event data can be used to confirm the preliminary identification. Other types of content determined to be shown in the image preliminarily identifying Bob Jones, such as the location depicted in the image, can be compared to event data stored in database 20. If, for example, the location depicted in the image is Bob Jones' house and event data stored in database 20 indicates that Bob Jones is known to have been in his house at the date and time of the image, then it is reasonably probable that the preliminary identification of Bob Jones in the image is correct and thus confirmed with a level of confidence corresponding to a level of confidence associated with the related event data.

Other types of event data may also be used to confirm the preliminary identification of Bob Jones in the image. For example, if content analysis of an image preliminarily identifies Bob Jones as a person in the image, event data as shown in FIG. 5 can be used to confirm the preliminary identification with an increased level of confidence. If Bob Jones is identified as wearing certain clothes in the image, the clothes worn by Bob Jones at the date and time of the image can be checked against information stored in one or more records such as the records shown in FIG. 5. If the identification of the clothes worn by Bob Jones in the image match the clothes identified in event data as being worn by Bob Jones at approximately the same date and time as when the image was captured, then the preliminary identification of Bob Jones as the person in the image can be confirmed with a level of confidence corresponding to the level confidence associated with the record in database 20. In one embodiment, probability distribution or interpolated methodology may be used to identify people with varying probability. A classifier can be used for different aspects/features separately or collectively/in conjunction. For example, an exact match of the clothes a person is wearing may not be needed to identify the person. If the person being identified is wearing similar clothes in all previous images, then an algorithm can be used to classify with a certain probability a match of the person in the image with the same person wearing different clothes in previous images.

In some images, not all of the people in the image may be recognized by content analysis (i.e., facial recognition). For example, if four people are determined to be in an image and only three are capable of being preliminarily identified using facial recognition, the identity of the fourth person may be determined using event data. If the image is determined to be associated with an event in which four people are present, this information can be used to identify the unknown fourth person shown in the image. Additional event data such as the clothes the fourth person is known to be wearing at the approximate date and time of the image may be used to confirm the identification of the fourth person with a level of confidence based on the additional event data used to make the identification. Additionally, if the forth person can be identified in another picture taken at the same event, features like the clothes that the person is wearing can be used to identify the person in another photo in which his/her face is not sufficiently visible to be identified.

It should be noted that event data can be used to determine that a preliminary identification of a person in an image is incorrect. For example, content analysis of an image using facial recognition may result in a preliminary identification of a person as a particular individual at a particular location. Event data may indicate that the particular individual was not at the location identified in the image, and thus, the preliminary identification is incorrect. For example, location data or calendar data could indicate that the person is at a different location or event. Additional event data may then be used to determine the identification of the person in the image.

Additional information associated with an image can be used to determine the content of the image. For example, since video is comprised of a sequence of images, each image, or a selected subset of images, of a video may be analyzed to determine the content of the image. The information obtained by this analysis of a sequence of images can be used to determine the content of each particular image. For example, each image in a sequence of images in a video may not depict people or objects completely as they may be cut out or occluded as they move out of frame in the sequence. The people or objects cut off in one image may be determined using images that occur before and after the current image that may contain complete depictions of the cut off person or object.

Audio associated with an image or video may also be analyzed using speech recognition, speaker identification, natural language processing, or the classification of environmental sounds (e.g., street, forest, desert, etc.) for use in determining the content of a related image. For example, a person's voiceprint may be identified and associated with a person shown in an image or video thereby identifying the person.

At step 204 of FIG. 2, image analyzer 14 generates identification metadata in response to identifying the person in the image. The identification metadata can be linked and stored with the related image. For example, an image and the associated metadata can be stored in the same file or location (e.g. EXIF data). The identification metadata can also be stored separate from the image with information identifying the image to which the identification metadata pertains. For example, identification metadata can be associated with a unique identifier that identifies a particular image.

The identification metadata generated at step 204 of FIG. 2 can additionally be used to add to the data contained in event database 20. For example, a person identified in an image together with information associated with the image can be used to created new records in the tables of FIGS. 4 and 5 as well as additional tables as appropriate.

Event data can be used to provide users with various images of a particular person, object, location, etc. For example, numerous images of a particular person can be provided to a user through user device 10 by querying database 20 via network 12 and image analyzer 14. In addition, images of a particular person over a particular period of time can be provided to a user. Various combinations of identifying information may be used to provide images to a user. For example, a user can query database 20 for a particular person at a particular location and be provided with one or more images based on the query.

A series of images of a particular person can be arranged for presentation based on event data associated with the particular person. For example, one image per year can be selected to form a sequence of images showing a particular person over time. In addition, event data allows identification and retrieval of images of a particular person at a particular time. For example, an image of a particular person 20 years ago can be determined using event data and then provided to a user.

In one embodiment, a particular person can be notified when an image depicting them is found. For example, image analyzer 14 can be configured to search various sources such as content provider 16, web 18, and one or more user devices such as user device 10 to acquire and analyze images. Image analyzer 14 can transmit a notification to a user when a particular person is identified in a new image. An image in which person is identified may be cropped and/or zoomed in to the particular person identified.

In one embodiment, event data stored in event database 20 can be used to identify images of a person at a specific time. For example, a user can query event database 20 to identify images of a person 20 years ago. Images of the particular person having dates approximately 20 years prior to the current date can be identified and presented to a user. A user can also query event database 20 to identify pictures of locations, objects, people, etc. as well as combinations of elements. For example, a user can query event database 20 for images of a particular person at a particular location including certain objects.

It should be noted that some users may be authorized to update or correct information contained in event database 20. For example, if the identification of people, objects, or locations is considered incorrect by a particular user, that user may be able to correct the identification of the particular person, object, or location. Event database 20 may be updated immediately to correct the information or it may be corrected after multiple users have requested the same correction.

It should be noted that the methods of identification described above can be used to determine content of images that are being transmitted in substantially real time such as video broadcasts and video conferencing. Identifications of people, locations, and objects, made during analysis can be used to augment the information contained in the video. For example, people shown in a video can be identified as the video is being shown and an overlay of identification information can be provided to a viewer.

In one embodiment, the identification of people, locations and objects in images can be augmented using information contained in communications associated with the images. In one embodiment, text of emails containing images can be scanned to determine if the text provides additional identification information concerning the images. In this embodiment, text in an email such as "Pictures of Jon Vanhass at the beach" can be used to augment the identification of people in the attached images as well as the location shown in the images. In addition, this information can be stored in event database 20 for use in later identifications.

In another embodiment, information from event data could be stored in database 20 and used to estimate social relationships between people from many images. As different people are identified using the content of images and event data about those people and images are stored, the system can begin to estimate social relationships between individuals. These relationships would have stronger or weaker computed links based on the co-occurrence of people (420 of FIG. 4) and event data from the corresponding images that they were identified in. For example, as Zoe Ellen and Nathanial Jackson appeared in more images together in different locations, the strength of a computed a social link could be incremented and the system might propose that Zoe and Nathanial are friends or are related. Similarly, if additional links between Zoe Ellen and Mary Ellen as well as Byron Ellen and Mary Ellen could be formulated. On subsequent computations, the system could then propose a weak link between Zoe and Byron or Nathanial and Mary. In an additional embodiment, social links determined as friends computed with the aforementioned technique could be promoted to stronger social link indicating family if other personal attributes like hair color (528 of FIG. 5), hair length (530 of FIG. 5), time (516 of FIG. 5), etc. from the event database 20 are considered as factual input to a statistical classification routine.

Figure 6:
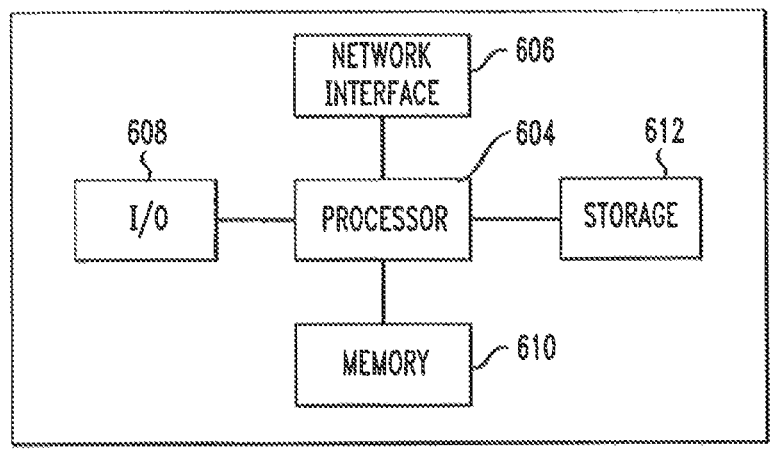
FIG. 6 is a high-level block diagram of a computer capable of implementing an image analyzer.

Image analyzer 14 may be implemented on a computer to perform the methods of FIGS. 2 and 3. A high-level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.), and loaded into memory 610 when execution of the computer program instructions is desired. Thus, the method steps of FIGS. 2 and 3 can be defined by the computer program instructions stored in the memory 610 and/or storage 612 and controlled by the processor 604 executing the computer program instructions. For example, the computer program instructions can be implemented as computer executable code programmed by one skilled in the art to perform an algorithm defined by the method steps of FIGS. 2 and 3. Accordingly, by executing the computer program instructions, the processor 1004 executes an algorithm defined by the method steps of FIG. 3. The computer 602 also includes one or more network interfaces 606 for communicating with other devices via a network. The computer 602 also includes input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the general inventive concept herein is not to be determined from the Detailed Description, but rather from the claims as interpreted according to the full breadth permitted by the patent laws. It is to be understood that the embodiments shown and described herein are only illustrative of the principles of the present inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method comprising:
   determining, by a processor, an identification of a person in a first image, captured at a first time, based on a first portion of the person being depicted in the first image;
   determining, by the processor, a location depicted in the first image based on content depicted in the first image;
   identifying, by the processor, a second image, captured at a second time different from the first time, depicting a second portion of the person being depicted in the first image;
   determining, by the processor, a location depicted in the second image based on content depicted in the second image; and
   confirming, by the processor, the identification of the person in the first image based on the location depicted in the first image matching the location depicted in the second image and a comparison of content of the first image and content of the second image.

2. The method of claim 1 further comprising:
   generating identification metadata in response to confirming the identification of the person in the first image.

3. The method of claim 2 further comprising:
   linking the identification metadata to the first image.

4. The method of claim 2 further comprising:
   generating a tag for the first image based on the identification metadata.

5. The method of claim 1, wherein the confirming the identification of the person in the first image is further based on existing metadata associated with the first image.

6. The method of claim 1 further comprising:
   transmitting a notification to a user associated with the person identified in the first image.

7. The method of claim 1, wherein the second portion is a more complete image of the person than the first portion.

8. An apparatus comprising:
   a processor; and
   a memory to store computer program instructions, the computer program instructions when executed on the processor cause the processor to perform operations comprising:
   determining an identification of a person in a first image, captured at a first time, based on a first portion of the person being depicted in the first image;
   determining a location depicted in the first image based on content depicted in the first image;
   identifying a second image, captured at a second time different from the first time, depicting a second portion of the person being depicted in the first image;
   determining a location depicted in the second image based on content depicted in the second image; and
   confirming the identification of the person in the first image based on the location depicted in the first image matching the location depicted in the second image and a comparison of content of the first image and content of the second image.

9. The apparatus of claim 8, the operations further comprising:
   generating identification metadata in response to confirming the identification of the person in the first image.

10. The apparatus of claim 9, the operations further comprising:
    linking the identification metadata to the first image.

11. The apparatus of claim 9, the operations further comprising:
    generating a tag for the first image based on the identification metadata.

12. The apparatus of claim 8, wherein the confirming the identification of the person in the first image is further based on existing metadata associated with the first image.

13. The apparatus of claim 8, the operations further comprising:
    transmitting a notification to a user associated with the person identified in the first image.

14. The apparatus of claim 8, wherein the second portion is a more complete image of the person than the first portion.

15. A computer readable storage device storing computer program instructions, which, when executed on a processor, cause the processor to perform operations comprising:
    determining an identification of a person in a first image, captured at a first time, based on a first portion of the person being depicted in the first image;
    determining a location depicted in the first image based on content depicted in the first image;
    identifying a second image, captured at a second time different from the first time, depicting a second portion of the person being depicted in the first image;
    determining a location depicted in the second image based on content depicted in the second image; and
    confirming the identification of the person in the first image based on the location depicted in the first image matching the location depicted in the second image and a comparison of content of the first image and content of the second image.

16. The computer readable storage device of claim 15, the operations further comprising:
    generating identification metadata in response to confirming the identification of the person in the first image.

17. The computer readable storage device of claim 16, the operations further comprising:
    linking the identification metadata to the first image.

18. The computer readable storage device of claim 15, wherein the confirming the identification of the person in the first image is further based on existing metadata associated with the first image.

19. The computer readable storage device of claim 15, the operations further comprising:
    transmitting a notification to a user associated with the person identified in the first image.

20. The computer readable storage device of claim 15, wherein the second portion is a more complete image of the person than the first portion.

* * * * *